(12) United States Patent
Oku et al.

(10) Patent No.: US 11,787,915 B2
(45) Date of Patent: Oct. 17, 2023

(54) METHOD OF PRODUCING POROUS MOLDED BODY

(71) Applicant: FUJIFILM Corporation, Tokyo (JP)

(72) Inventors: Keisuke Oku, Minami-ashigara (JP); Koju Ito, Minami-ashigara (JP); Hiroshi Yabu, Sendai (JP); Yoshiaki Uchida, Toyonaka (JP)

(73) Assignee: FUJIFILM Corporation, Tokyo (JP)

( * ) Notice: Subject to any disclaimer, the term of this patent is extended or adjusted under 35 U.S.C. 154(b) by 606 days.

(21) Appl. No.: 16/935,874

(22) Filed: Jul. 22, 2020

(65) Prior Publication Data

US 2020/0347198 A1 Nov. 5, 2020

Related U.S. Application Data

(63) Continuation of application No. PCT/JP2019/001729, filed on Jan. 21, 2019.

(30) Foreign Application Priority Data

Jan. 23, 2018 (JP) ................ 2018-008560

(51) Int. Cl.
*C08J 9/26* (2006.01)
*B29C 41/02* (2006.01)
(Continued)

(52) U.S. Cl.
CPC ............. *C08J 9/26* (2013.01); *B29C 41/02* (2013.01); *C08J 5/18* (2013.01); *B29K 2077/10* (2013.01);
(Continued)

(58) Field of Classification Search
CPC ....... B29C 67/20; B29C 67/08; B29C 44/356; B29C 41/02; C08J 5/18; C08J 2201/044; C08J 2201/042; C08J 2201/04; C08J 9/26
See application file for complete search history.

(56) References Cited

U.S. PATENT DOCUMENTS

| 6,395,792 B1 | 5/2002 | Nagasuna et al. |
| 2016/0059537 A1 | 3/2016 | Ito et al. |
| 2018/0361347 A1* | 12/2018 | Iwai ................ C12M 23/20 |

FOREIGN PATENT DOCUMENTS

| CN | 105164190 A | 12/2015 |
| CN | 105968402 A | 9/2016 |

(Continued)

OTHER PUBLICATIONS

Taiwanese Office Action dated Jun. 20, 2022 for corresponding Taiwanese Patent Application No. 108102470, with an English translation.
(Continued)

*Primary Examiner* — Stella K Yi
(74) *Attorney, Agent, or Firm* — Birch, Stewart, Kolasch & Birch, LLP

(57) ABSTRACT

A molding device produces a porous film from a molding material which is an emulsion. In a case where a volume of a dispersed phase is X1 and a volume of a continuous phase is X2, the molding material has a value of X1/(X1+X2) within a range of 0.5 or more and 0.9 or less. In the molding material, a specific gravity of the dispersed phase is greater than a specific gravity of the continuous phase. The molding material includes a water phase containing a curable compound as the continuous phase, and forms a liquid film on a support. Thereafter, the curable compound in the liquid film is cured. After curing, the dispersed phase is removed.

17 Claims, 9 Drawing Sheets

(51) Int. Cl.
*C08J 5/18* (2006.01)
*B29K 77/00* (2006.01)
*B29K 105/04* (2006.01)

(52) U.S. Cl.
CPC .. *B29K 2105/04* (2013.01); *B29K 2995/0092* (2013.01); *C08J 2201/0462* (2013.01)

(56) References Cited

FOREIGN PATENT DOCUMENTS

| EP | 3392299 A1 | 10/2018 |
|---|---|---|
| JP | 56-61437 A | 5/1981 |
| JP | 2009-242492 A | 10/2009 |
| JP | 2013-147521 A | 8/2013 |
| WO | WO 01/27164 A1 | 4/2001 |
| WO | WO 2017/104610 A1 | 6/2017 |

OTHER PUBLICATIONS

Extended European Search Report, dated Feb. 4, 2021, for corresponding European Application No. 19744508.3.
International Preliminary Report on Patentability and Written Opinion of the International Searching Authority with an English translation, dated Aug. 6, 2020 for corresponding International Application No. PCT/JP2019/001729.
International Search Report, dated Apr. 23, 2019, for corresponding International Application No. PCT/JP2019/001729, with an English translation.
Chinese Office Action and Search Report for corresponding Chinese Application No. 201980009369.X, dated Mar. 14, 2022, with an English translation.
Japanese Notice of Reasons for Refusal for corresponding Japanese Application No. 2019-567065, dated Aug. 17, 2021, with an English translation.

* cited by examiner

METHOD OF PRODUCING POROUS MOLDED BODY

CROSS-REFERENCE TO RELATED APPLICATIONS

This application is a Continuation of PCT International Application No. PCT/JP2019/001729 filed on 21 Jan. 2019, which claims priority under 35 U.S.C § 119(a) to Japanese Patent Application No. 2018-008560 filed on 23 Jan. 2018. The above application is hereby expressly incorporated by reference, in its entirety, into the present application.

BACKGROUND OF THE INVENTION

1. Field of the Invention

The present invention relates to a method of producing a porous molded body.

2. Description of the Related Art

A film-like porous molded body (hereinafter, referred to as a porous film) having a honeycomb structure formed by densely and regularly forming a plurality of fine void portions (holes) to be aligned along a film surface is known. As a method of producing the porous film having a honeycomb structure, a dew condensation method (also referred to as a breath figure method) is known. The dew condensation method is a method in which a solution including a hydrophobic material for forming a porous film is cast to form a cast film, dew is condensed on this cast film, and then a solvent and water droplets are evaporated, thereby producing a porous film. Since the water droplets act as casting molds and a plurality of extremely fine void portions are formed in a state of being regularly arranged, for example, the porous film obtained by the dew condensation method is useful in a medical field such as a cell culture base (culture carrier) for culturing cells, a synechia preventive material, or a filtration filter.

In the dew condensation method, since water droplets are used as casting molds as described above, a porous film cannot be produced using a hydrophilic material, and the diameter of the void portions to be formed is limited. In this regard, WO2017/104610A (corresponding to US2018/0361347A1) discloses a porous film which has void portions to be formed with a diameter larger than the diameter of void portions of the porous film produced by the above-described dew condensation method and is constituted of a hydrophilic material. The porous film of WO2017/104610A is produced through a step of injecting an emulsion including a dispersed phase and a continuous phase between a pair of substrates arranged in parallel by a capillary phenomenon. As described above, in the production method using the emulsion, the dispersed phase of the emulsion functions as a casting mold for forming a void portion. JP-S56-061437A (JP1981-061437A) also discloses a method of producing a porous film constituted of a hydrophilic material using an emulsion.

WO2001/027164A (corresponding to U.S. Pat. No. 6,395,792B1) also discloses a method of producing a porous film from an emulsion having an oil phase as a continuous phase. In WO2001/027164A, a porous film constituted of a hydrophobic material is produced by, while horizontally transporting a film formed of an emulsion, polymerizing a polymerizable compound in the continuous phase. In the emulsion of WO2001/027164A, a ratio W/O between a mass W of water droplets as a dispersed phase and a mass O of the oil phase as the continuous phase is set to 3/1 or more.

SUMMARY OF THE INVENTION

In the production method of WO2017/104610A, an emulsion is injected between a pair of substrates by a capillary phenomenon, and therefore, improvement in production efficiency is desired. In the production methods of JP-S56-061437A (JP1981-061437A) and WO2001/027164A, although a porous film having a high void volume can be obtained, the arrangement state of void portions lacks orderliness and cannot be said to have regularity. In addition, a porous film constituted of a hydrophilic material cannot be produced by the method of WO2001/027164A.

Accordingly, an object of the present invention is to provide a method of producing a porous molded body capable of efficiently producing a porous molded body which is constituted of a hydrophilic material and has void portions densely arranged with regularity.

In order to solve the above problems, a method of producing a porous molded body according to an aspect of the present invention includes a film forming step, a curing step, and a dispersed phase removal step, and is provided for producing a porous molded body from an emulsion including a continuous phase and a dispersed phase. In the film forming step, a film is formed from the emulsion including a water phase containing a curable compound as the continuous phase. In the curing step, the curable compound is cured after the film forming step. In the dispersed phase removal step, the dispersed phase of the film is removed after the curing step. In the emulsion, in a case where a volume of the dispersed phase is X1 and a volume of the continuous phase is X2, a value of X1/(X1+X2) is within a range of 0.5 or more and 0.9 or less, and a specific gravity of the dispersed phase is greater than a specific gravity of the continuous phase.

It is preferable that liquid droplets of the dispersed phase of the emulsion are freely deformable. It is preferable that in the emulsion, in a case where a specific gravity of the dispersed phase is Y1 and a specific gravity of the continuous phase is Y2, a specific gravity difference obtained by Y1−Y2 is at least 0.001.

It is preferable that in the film forming step, the film is formed by spreading the emulsion on a support.

It is preferable that in the film forming step, the film is formed on a moving support.

It is preferable that the method of producing a porous molded body includes a base production step and an uneven distribution step. In the base production step, a first liquid forming the dispersed phase is discharged as a liquid droplet in a flow of a second liquid forming the continuous phase from a distal end of a tubular member in a direction of the flow of the second liquid to produce an emulsion base having a value of X1/(X1+X2) smaller than that of the emulsion. In the uneven distribution step, the dispersed phase in the emulsion base is unevenly distributed to generate an uneven distribution region having a value of X1/(X1+X2) within a range of 0.5 or more and 0.9 or less in the emulsion base. It is preferable that in the film forming step, the uneven distribution region generated in the emulsion base is used as the emulsion.

It is preferable that in the dispersed phase removal step, a solvent of the dispersed phase is brought into contact with the film to remove the dispersed phase.

According to the aspect of the present invention, it is possible to efficiently produce a porous molded body which is constituted of a hydrophilic material and has void portions densely arranged with regularity.

DESCRIPTION OF THE PREFERRED EMBODIMENTS

Figure 1:
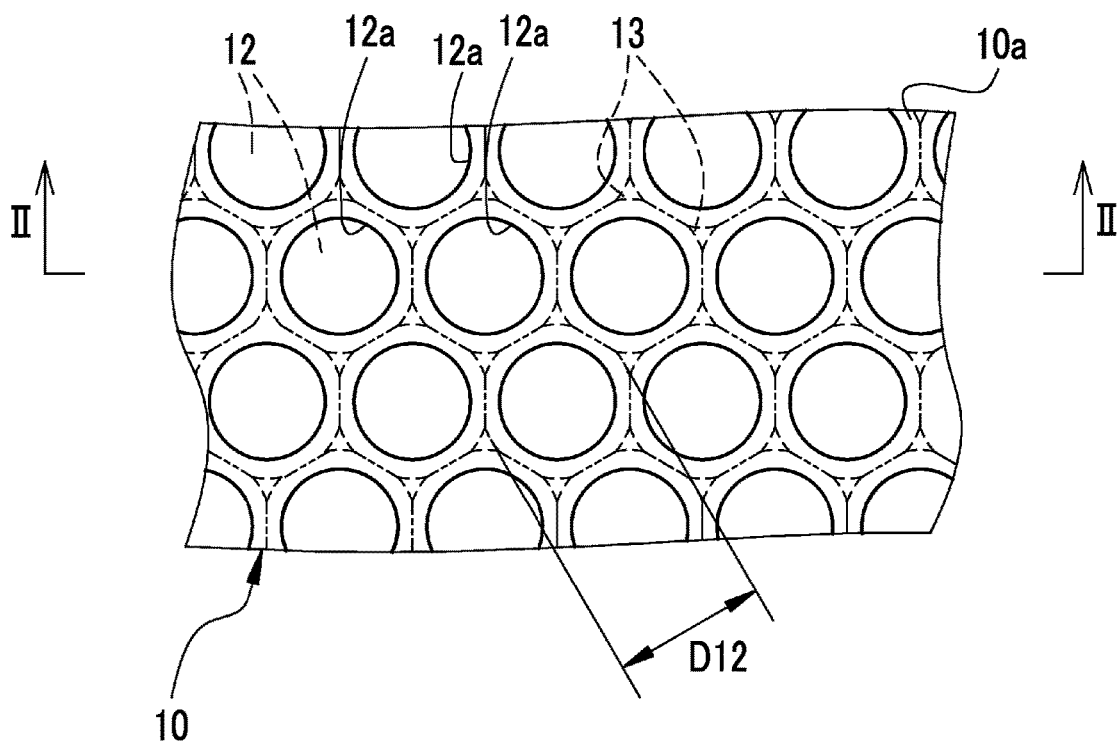
FIG. 1 is a plan view of a porous film produced by a production method embodying the present invention.

In FIG. 1, a film-like porous molded body (hereinafter, referred to as a porous film) 10 has a plurality of void portions 12 formed as holes. The plurality of void portions 12 have substantially the same size (shape and size). The void portions 12 are arranged in a hexagonal shape in a close-packed manner along one film surface (hereinafter, referred to as a first film surface) 10a, that is, are arranged in a two-dimensional hexagonal shape in a close-packed manner, and are opened on the first film surface 10a. Thus, the porous film 10 has a honeycomb structure. Although the void portions 12 are spherical, the void portions are not strictly perfectly spherical because of the close-packed arrangement as described above, and have a spherical shape in which a perfect sphere is slightly distorted. An opening portion formed by the void portion 12 on the first film surface 10a is denoted by reference numeral 12a. A diameter D12 of the void portion 12 is 0.4 mm, but is not limited to this example. The void portion can be formed with a diameter within a range of 0.1 mm or more and 1 mm or less.

Figure 2:
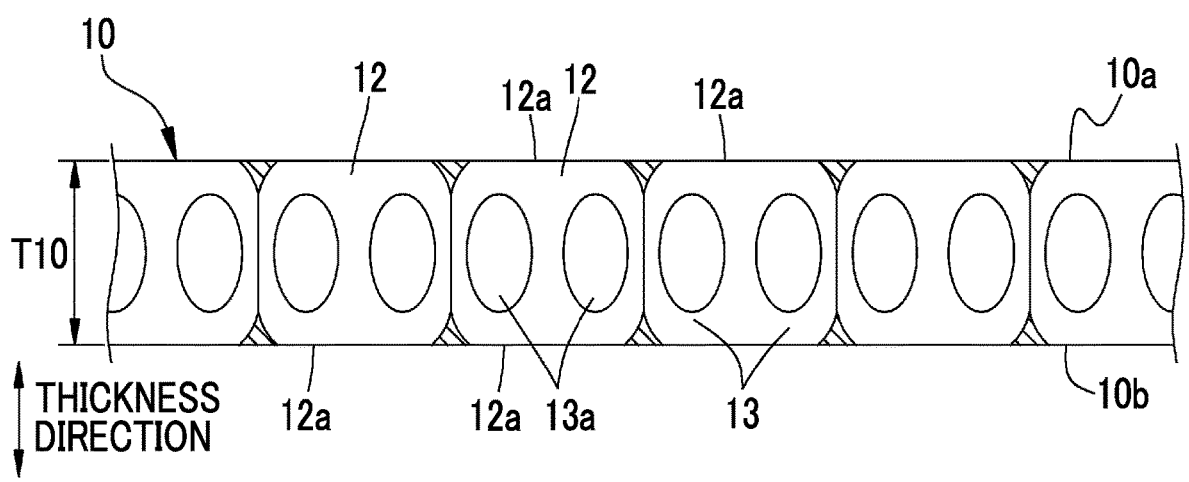
FIG. 2 is a cross-sectional view taken along line II-II in FIG. 1.

The void portions 12 communicate with each other as shown in FIGS. 1 and 2, and a communication hole 13a is formed in a partition wall 13 between the void portions 12 as shown in FIG. 2. Therefore, each of the void portions 12 is a conceptually space portion virtually partitioned, and the plurality of void portions 12 form continuous voids along a first film surface 10a inside the porous film 10. Since the void portions 12 communicate with each other, for example, the film can be used for various applications such as a cell culture base, a light scattering prevention filter, a sound absorbing material, and a filtration filter.

As shown in FIG. 2, the void portions 12 penetrate the film in the thickness direction and are also opened on the other film surface (hereinafter, referred to as a second film surface) 10b. In FIG. 2, the opening portion formed by the void portion 12 on a second film surface 10b is denoted by reference numeral 12a.

A thickness T10 of the porous film 10 is 0.2 mm but is not limited to this example. The porous film can be formed with a thickness within a range of 0.05 mm or more and 1 mm or less.

Figure 3:
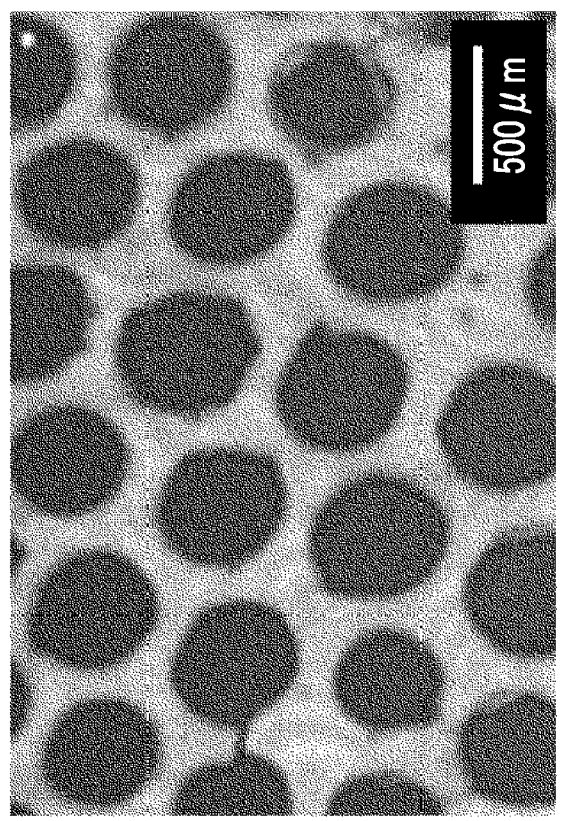
FIG. 3 is an X-ray computed tomography (CT) image of the porous film.

The porous film 10 is formed of polyacrylamide, which is a hydrophilic material. Examples of other hydrophilic materials forming the porous film 10 include various water-soluble polymers, polysaccharides (for example, cellulose or chitosan), and proteins (for example, collagen or fibroin), and a mixture of at least two of the above materials may be used. The porous film 10 formed of a hydrophilic material can be used for various applications, for example, such as a cell culture base, a light scattering prevention filter, a sound absorbing material, and a filtration filter. In the embodiment, a case where the solubility with respect to pure water is 0.2 g/ml or more is considered that the material is hydrophilic. A case where the solubility with respect to pure water is 0.01 g/ml or less is considered that the material is hydrophobic. In this embodiment, the solubility with respect to pure water is obtained from Test No. 105: Water Solubility, described in OECD guidelines for the Testing of Chemicals (OECD stands for the Organization for Economic Co-operation and Development). In a case where a molding material 16 (refer to FIG. 4) described later contains a surfactant, the obtained porous film 10 may also contain a surfactant. The aspect of the porous film 10 in which the void portions 12 are densely arranged with regularity as described above is confirmed by, for example, an X-ray computed tomography (CT) image as shown in FIG. 3. In addition, the image of FIG. 3 is an image of a center part taken out from an imaged image of the porous film 10 obtained by storing the porous film 10 obtained by a method described later in water, then taking out the film from the water, and freeze-drying the porous film.

Figure 4:
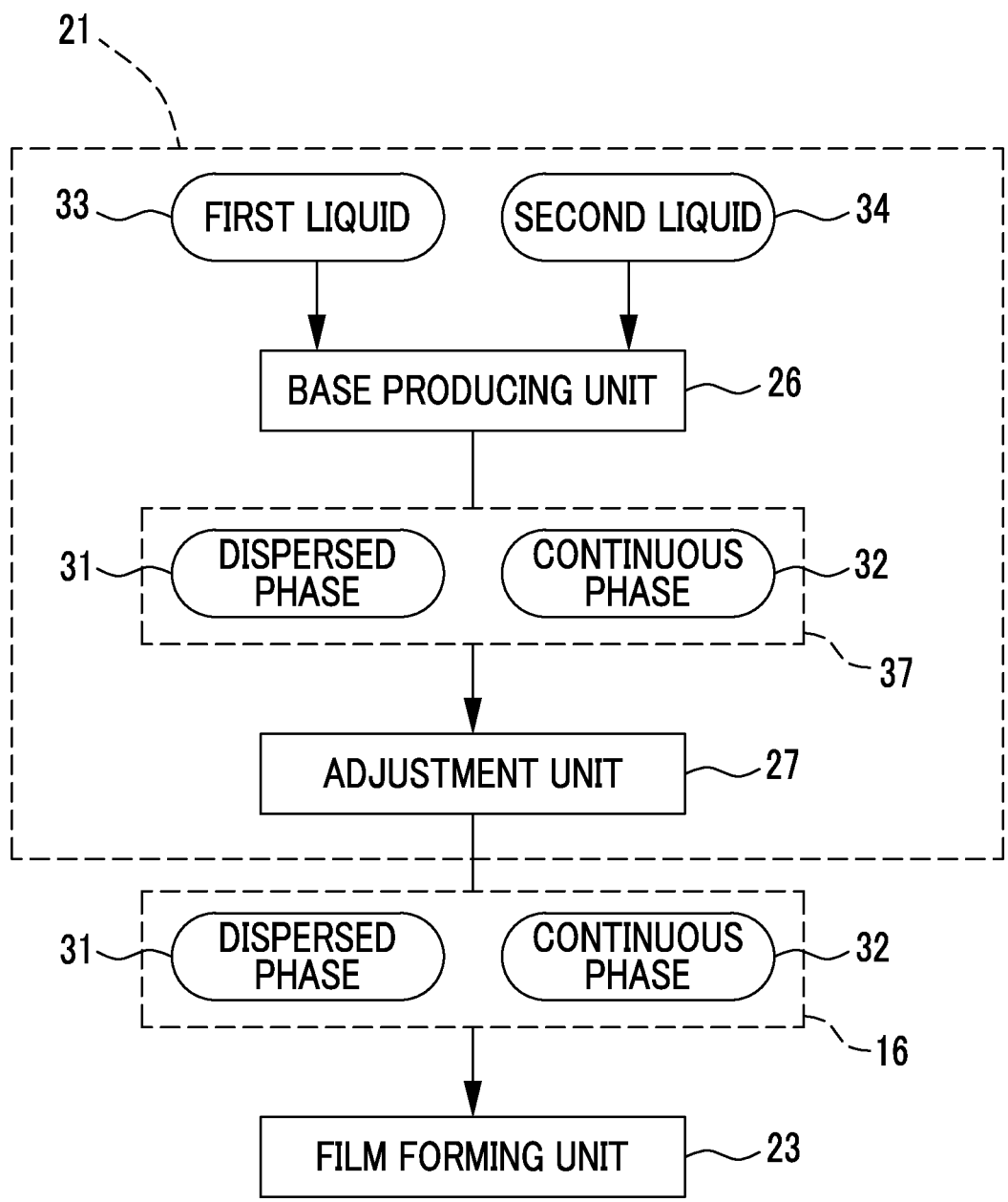
FIG. 4 is an explanatory view of a molding material preparation device.

The porous film 10 is produced by the following method, for example. A molding material preparation device 21 shown in FIG. 4 is provided for preparing the molding material 16, and the prepared molding material 16 is supplied to a film forming unit 23 of a molding device 22 (refer to FIG. 10). The molding material preparation device 21 includes a base producing unit 26 and an adjustment unit 27.

The molding material 16 is an emulsion having a dispersed phase 31 and a continuous phase 32. The base producing unit 26 produces an emulsion base 37 in which the volume ratio of the dispersed phase 31 is smaller than the volume ratio of the molding material 16 from a first liquid 33 that becomes the dispersed phase 31 and a second liquid 34 that becomes the continuous phase 32. The adjustment unit 27 adjusts the volume ratio of the dispersed phase 31 to make the emulsion base 37 into the molding material 16 by this adjustment. In a case where the volume of the dispersed phase 31 is X1 and the volume of the continuous phase 32 is X2, the volume ratio of the dispersed phase 31 is obtained by $X1/(X1+X2)$.

The first liquid 33 is a hydrophobic liquid, and in the example, polydimethylsiloxane is used. The first liquid 33 has a higher specific gravity than the second liquid 34 since a specific gravity adjusting agent described later is contained. Thus, the dispersed phase 31 having a higher specific gravity than the continuous phase 32 is generated. In a case where the specific gravity of the first liquid 33 is Y1, the first liquid 33 becomes the dispersed phase 31 and thus the specific gravity of the dispersed phase 31 also becomes Y1. Similarly, since the second liquid 34 becomes the continuous phase 32, in a case where the specific gravity of the second liquid 34 is Y2, the specific gravity of the continuous phase 32 also becomes Y2. The specific gravity difference obtained by Y1−Y2 is preferably 0.001 or more (at least 0.001), and is 0.080 in the example. In a case where the specific gravity difference is 0.001 or more, compared with a case where the specific gravity difference is less than 0.001, the dispersed phase 31 is more likely to be unevenly distributed in the molding material 16 in the vertical direction, that is, to be unevenly distributed downward.

It is more preferable that the specific gravity difference between the first liquid 33 and the second liquid 34 is within a range of 0.001 or more and 0.200 or less. In a case where the specific gravity difference is 0.200 or less, compared with a case where the specific gravity difference is more than 0.200, the coalescence of the dispersed phases 31 as liquid droplets in the molding material 16 is suppressed more reliably and/or for a long period of time. For example, in a case where the specific gravity difference is too large, the dispersed phase 31 in a state in which the dispersed phases are unevenly distributed downward (precipitation state) may be crushed and the stable state as liquid droplets may be disturbed. The specific gravity difference between the first liquid 33 and the second liquid 34 is more preferably within a range of 0.030 or more and 0.150 or less, and particularly preferably within a range of 0.050 or more and 0.100 or less.

The specific gravity Y1 and the specific gravity Y2 are obtained on the basis that the specific gravity of water at 25° C. is 1. In the embodiment, more specifically, each specific gravity is obtained by preparing the first liquid 33 and the second liquid 34 each having a volume V at 25° C., measuring the mass W of each of the prepared first liquid 33 and the second liquid 34 ten times, and calculating a value by an expression of W/V for each measurement value. Then, the average value of the ten calculated values of each liquid is obtained as the specific gravities Y1 and Y2.

The first liquid 33 preferably contains a compound that increases the specific gravity as a specific gravity adjusting agent. The specific gravity adjusting agent in this example is bromobenzene. However, the specific gravity adjusting agent is not limited thereto, and a compound that is present in a state of being dissolved in the dispersed phase 31 and has a higher specific gravity than a component of the dispersed phase 31 (in the example, polydimethylsiloxane) may be used. For example, chloroform and/or carbon tetrachloride can be used. Further, it is preferable that the specific gravity adjusting agent is contained at a mass ratio within a range of 1% or more and 30% or less with respect to the first liquid 33. In a case where the mass of the first liquid 33 (including the mass of the specific gravity adjusting agent) is M1, and the mass of the specific gravity adjusting agent is M2, the mass ratio is a percentage obtained by (M2/M1)×100.

The second liquid 34 contains a curable compound and is a hydrophilic liquid. The second liquid 34 of the example contains a curable compound and water as a solvent of the curable compound, but in a case where the curable compound is a liquid incompatible with the first liquid 33 which is a hydrophobic liquid, the second liquid 34 may not contain water. In addition, the liquid incompatible with the hydrophobic liquid means that the solubility of the liquid with respect to the hydrophobic liquid is 0.01 g/ml or less.

In the example, the curable compound is an ultraviolet curable compound that is cured by irradiation with ultraviolet rays, but is not limited thereto. Examples of the curable compound include a compound in which a curable functional group is modified with a monomer, and for example, an energy ray-curable compound that is cured by irradiation with energy rays, a thermosetting compound that is cured by heating, and an ion-curable compound that is cured by an ionic reaction can be used. As the energy ray-curable compound, for example, a photocurable compound that is cured by light such as ultraviolet rays as in the embodiment can be used. Such a curable compound can be obtained by modifying a functional group having energy ray curability (including photocurability) and/or thermosetting properties by the method in a handbook of organic synthesis (for example, organic synthesis experiment handbook (Organic Synthetic Chemistry Association)), and the like. Examples of the ion-curable compound include a system in which sodium alginate is allowed to react with a polyvalent cation such as calcium (Ca) ion.

It is preferable that the curable compound has biocompatibility. Thereby, the porous film 10 that can be used for a cell culture base, a hemostatic material, an adhesion preventing material, and/or a wound dressing material is obtained. The biocompatibility means a property that does not have a harmful effect on a living body such as toxicity to the living body in a case where a material is placed in the living body (including the inside of the digestive tract) or in a case where a material is attached to the outside of the living body.

The second liquid 34 may contain a crosslinking agent for curing a curable compound, an initiator for initiating curing of a curable compound, and/or a surfactant, and in the example, the second liquid also contains these materials. The crosslinking agent used in the example is N,N'-methylenebisacrylamide, the initiator is IRGACURE (registered trademark) 2959 (manufactured by BASF SE), and the surfactant is polyvinyl alcohol. Other examples of the surfactant include surfactants having a hydrophilic-lipophilic balance (HLB) value of 11 or more and 16 or less, such as ADEKATOL (registered trademark) LA and NIKKOL Hexaglyn 1-M (hexaglyceryl monomyristate).

Figure 5:
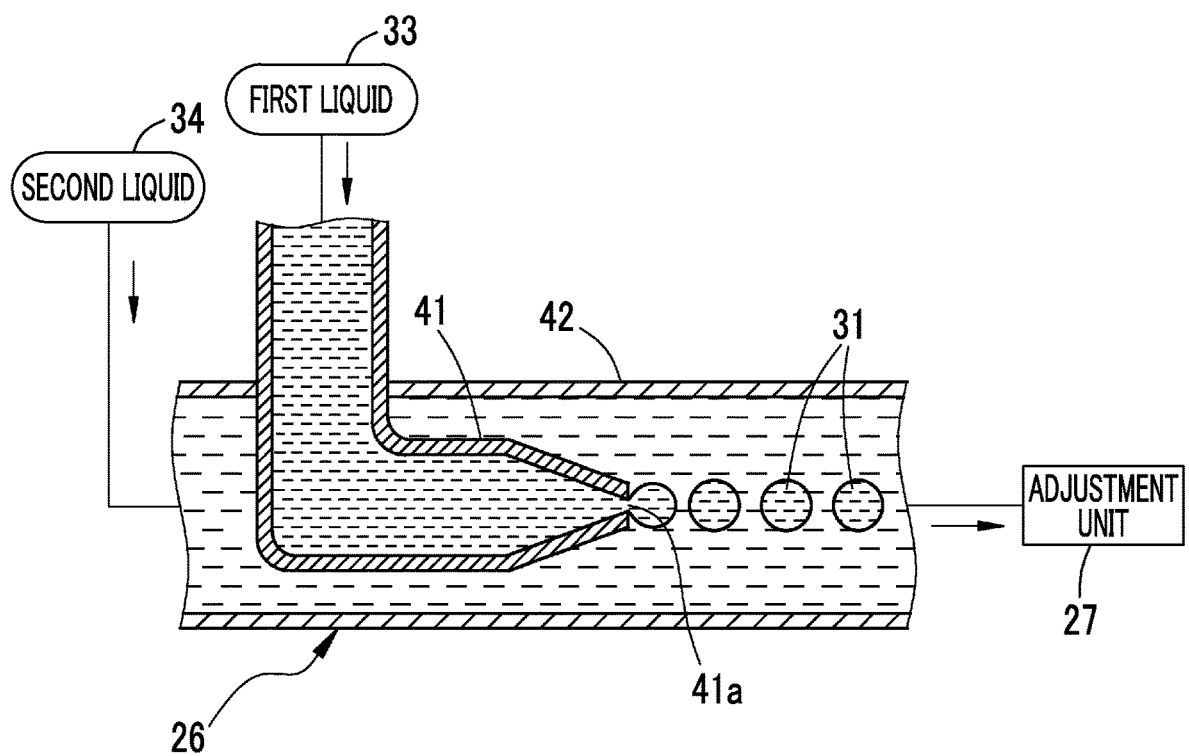
FIG. 5 is a schematic view of a base producing unit.

The base producing unit 26 shown in FIG. 5 includes a first pipe 41 and a second pipe 42 as tubular members. A pump (not shown) for feeding the first liquid 33 is connected to the first pipe 41, and a pump (not shown) for feeding the second liquid 34 is connected to the second pipe 42. The first pipe 41 supplies the first liquid 33 that becomes the dispersed phase 31. The second pipe 42 feeds the second liquid 34 that becomes the continuous phase 32. The second liquid 34 is guided to the second pipe 42 by the pump, and flows in one direction through the hollow portion (flow path) of the second pipe 42. The first pipe 41 is fitted to the side surface of the second pipe 42 in a state in which one end side is disposed in the hollow portion of the second pipe 42. An opening 41a on one end side of the first pipe 41 is disposed in a state in which the opening is directed to a direction of the flow of the second liquid 34 flowing in the hollow portion of the second pipe 42 in one direction. Thus, the first liquid 33 flowing from the other end side of the first pipe 41 is discharged as liquid droplets from the opening 41a in the flow direction of the second liquid 34 in the flow of the second liquid 34. Thus, the emulsion base 37 is produced (base production step). The opening 41a is located substantially at the center of the hollow portion having a circular cross section of the second pipe 42.

The liquid droplets of the dispersed phase 31 are preferably freely deformable, and the same is applied in the example. The diameter of the liquid droplet as the dispersed phase 31 is preferably within a range of 20 μm or more and 1 mm or less. In a case where the diameter is 20 μm or more, compared with a case where the diameter is less than 20 μm, the liquid droplets are less likely to coalesce and are more reliably maintained as freely deformable liquid droplets of the dispersed phase 31. In a case where the diameter is 1 mm or less, compared with a case where the diameter is more than 1 mm, the molding material 16 capable of more reliably maintaining the shape of the liquid droplets in a spherical shape in a left state can be obtained. The diameter of the dispersed phase 31 is more preferably within a range of 0.1 mm or more and 1 mm or less, and even more preferably within a range of 0.2 mm or more and 0.6 mm or less.

In the embodiment, the first pipe 41 having an outer diameter within a range of 0.8 mm or more and 3.0 mm or less, and the second pipe 42 having an inner diameter larger than the outer diameter of the first pipe 41 and having an outer diameter within a range of approximately 1.4 mm or more and 4.0 mm or less are used. However, the first pipe 41 and the second pipe 42 are not limited to this example.

Here, the feeding flow rate of the first liquid 33 in the first pipe 41 is set to V1 and the feeding flow rate of the second liquid 34 in the second pipe 42 is set to V2. In the embodiment, by supplying the first liquid 33 and the second liquid 34 under the following conditions that V1 is set to 3 ml/hr, and V2 is set to 4.5 ml/hr, the dispersed phase 31 is generated as a liquid droplet, and thereby, an emulsion base 37 in which the diameters of the dispersed phases 31 are uniform is produced. However, the feeding flow rates V1 and V2a are not limited to this example. The base producing unit 26 is particularly effective in a case where the dispersed phase 31 has a relatively large diameter within a range of 300 μm or more and 1 mm or less.

Figure 6:
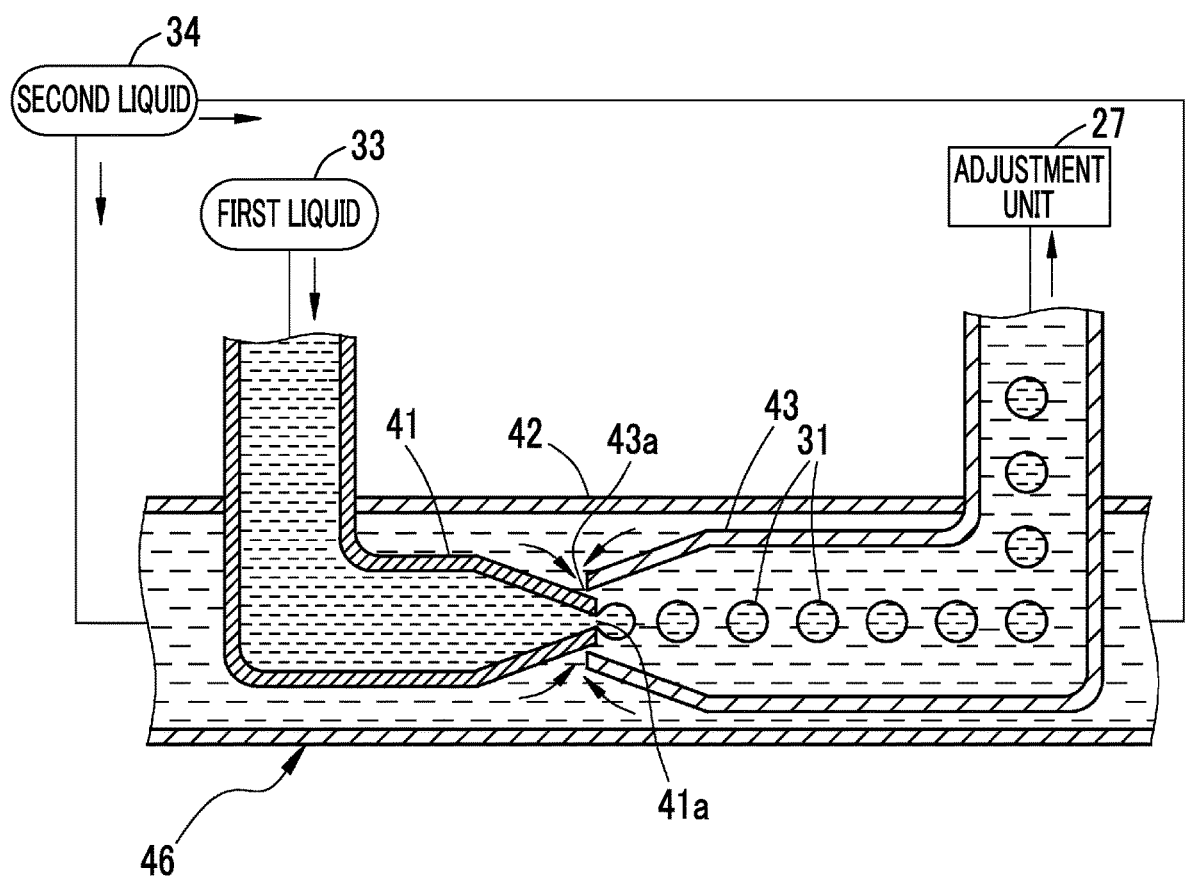
FIG. 6 is a schematic view of another base producing unit.

A base producing unit 46 shown in FIG. 6 is particularly effective in a case where the dispersed phase 31 having a relatively small diameter of 100 μm or more and less than 400 μm, particularly, 100 μm or more and 350 μm or less, is formed and can be used instead of the base producing unit 26. The base producing unit 46 has a configuration in which a third pipe 43 as a tubular member is added to the base producing unit 26. The third pipe 43 is a pipe for producing the emulsion base 37. In the base producing unit 46, two pumps (not shown) are connected to the second pipe 42, one of the two pumps is connected to one end of the second pipe 42, and the other is connected to the other end of the second pipe 42. Thus, the second liquid 34 is feed from each of both ends of the second pipe 42 to the hollow portion of the second pipe 42. The two pumps respectively adjust the feeding flow rate of the second liquid 34.

Similarly to the first pipe 41, the third pipe 43 is fitted to the side surface of the second pipe 42 in a state in which one end side is disposed in the hollow portion of the second pipe 42. The third pipe 43 is provided in the hollow portion of the second pipe 42 in a state in which one end side thereof faces the above-described one end side of the first pipe 41. An opening 43a at one end of the third pipe 43 is formed larger than the opening 41a of the first pipe 41, and in this example, the opening 43a is arranged in a state in which the opening 41a surrounds one end of the first pipe 41 on the opening 41a side. However, the positional relationship between the opening 41a and the opening 43a in the lateral direction in FIG. 6 is appropriately set according to properties such as the viscosity of the first liquid 33 and the second liquid 34, the feeding flow rate V1, and the feeding flow rates V2a and V2b described later, each diameter of the first to third pipes 41 to 43, and/or the diameter of the liquid droplet of the desired dispersed phase 31.

The outer shape of the third pipe 43 in this example is within a range of 0.8 mm or more and 3.0 mm or less. However, the third pipe 43 is not limited to this example.

Here, the feeding flow rate of the second liquid 34 from one end side to which the first pipe 41 is fitted in the longitudinal direction of the second pipe 42 is set to V2a, and the feeding flow rate of the second liquid 34 from the other end side to which the third pipe 43 is fitted is set to V2b. For example, the first liquid 33 and the second liquid 34 are supplied under the condition that V1 is set to 2 ml/hr, V2a is set to 3 ml/hr, and V2b is set to 3 ml/hr. Thus, the dispersed phase 31 as a liquid droplet is generated in the hollow portion (flow path) of the third pipe 43, and the emulsion base 37 is produced (base production step). However, the feeding flow rates V1, V2a, and V2b are not limited to this example.

Figure 7:
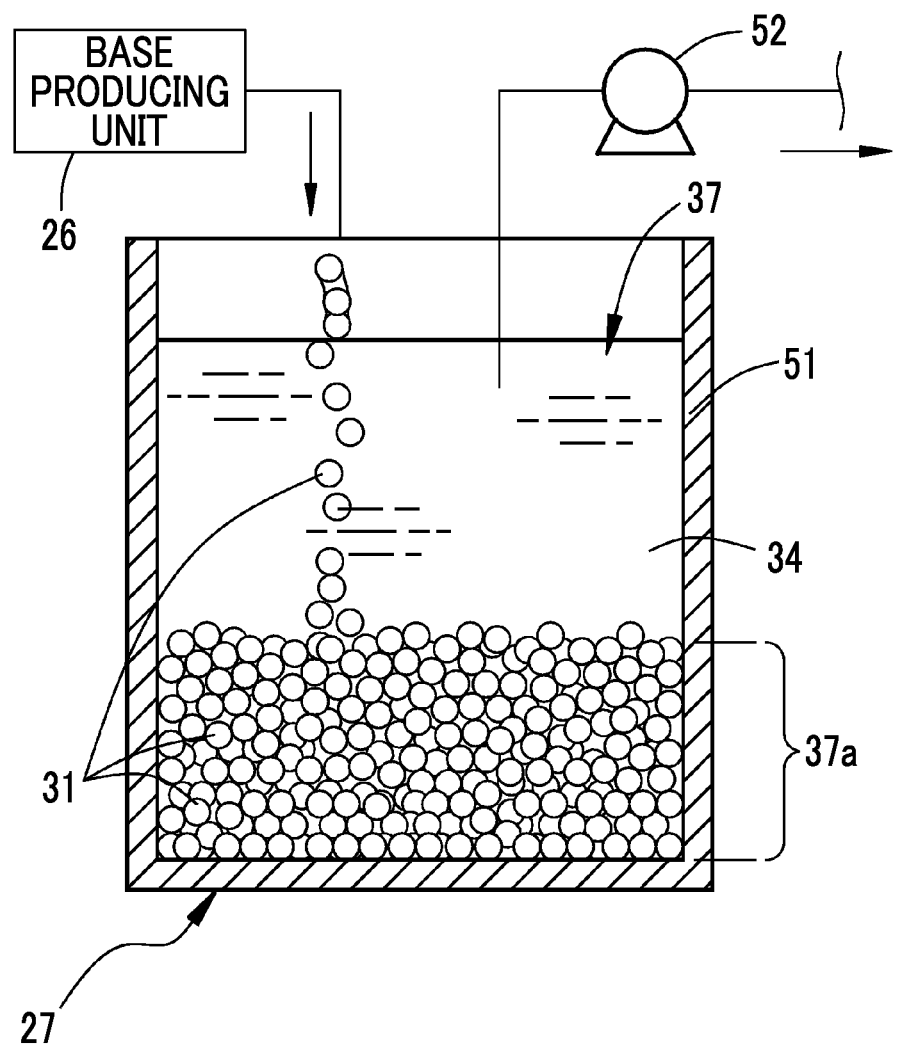
FIG. 7 is a schematic view of an adjustment unit.

The obtained emulsion base 37 is fed to a container 51 of the adjustment unit 27 shown in FIG. 7. Although FIG. 7 shows a state in which the base producing unit 26 is connected to the adjustment unit 27, the base producing unit 26 can be replaced with a base producing unit 46 (refer to FIG. 6). As shown in FIG. 7, the adjustment unit 27 includes the container 51 that stores the emulsion base 37 and a pump 52. The pump 52 sucks the second liquid 34 from the emulsion base 37 in the container 51, and the volume ratio of the dispersed phase 31 in the emulsion base 37 is increased to be within a range of 0.5 or more and 0.9 or less. Thus, an emulsion in which the specific gravity of the dispersed phase 31 is greater than the specific gravity of the continuous phase 32 and the volume ratio of the dispersed phase 31 is within a range of 0.5 or more and 0.9 or less is obtained as the molding material 16. In a case where the volume ratio of the dispersed phase 31 is 0.5 or more, compared with a case where the volume ratio is less than 0.5, as will be described later, in the film forming step, the dispersed phase 31 enters a gap 77 (refer to FIG. 9) in a dense state, and thereby the liquid droplets as the dispersed phase 31 are arranged in the gap 77 so as to be in contact with each other. In addition, in a case where the volume ratio of the dispersed phase 31 is 0.9 or less, compared with the case where the volume ratio is more than 0.9, the coalescence of the liquid droplets of the dispersed phase 31 in the molding material 16 is more reliably suppressed. In the molding material 16, the volume ratio of the dispersed phase 31 is more preferably 0.6 or more and 0.85 or less, and even more preferably 0.7 or more and 0.8 or less.

As a method of obtaining the volume ratio of the dispersed phase 31, for example, there is a method of obtaining the volume ratio from an image observed with a microscope. Specifically, the average size and the number density of the liquid droplets of the dispersed phase 31 are obtained from the observed image of the molding material 16, and the volume ratio of the dispersed phase 31 can be calculated from the average size and the number density.

Since the specific gravity of the dispersed phase 31 is greater than the specific gravity of the continuous phase 32 constituted of the second liquid 34, the dispersed phase 31 easily sinks downward. Therefore, in the example, the dispersed phase 31 is unevenly distributed in the emulsion base 37, and the dispersed phase 31 is precipitated at the lower part. Thereby, it becomes easy to selectively suck the second liquid 34 from the upper part of the emulsion base 37, and the yield of the molding material 16 from the emulsion base 37 is improved.

It is preferable that in the lower part of the emulsion base 37, a region 37a (hereinafter, referred to as an uneven distribution region) in which the volume ratio of the dispersed phase 31 is higher than the volume ratio in the upper part and is within a range of 0.5 or more and 0.9 or less is formed (uneven distribution step), and in the example, the same is applied. Thus, as in a case of using the adjustment unit 27, the molding material 16 can be obtained by removing the second liquid 34 from the upper part. Also, for example, by extracting the uneven distribution region 37a from the lower part of the container 51 using gravity, the extracted uneven distribution region 37a can be used as the molding material 16 as it is. For this reason, the working efficiency can be improved, and the step of obtaining the molding material 16 from the emulsion base 37 can be automated, so that the production efficiency of the porous film 10 can be improved.

Figure 8:
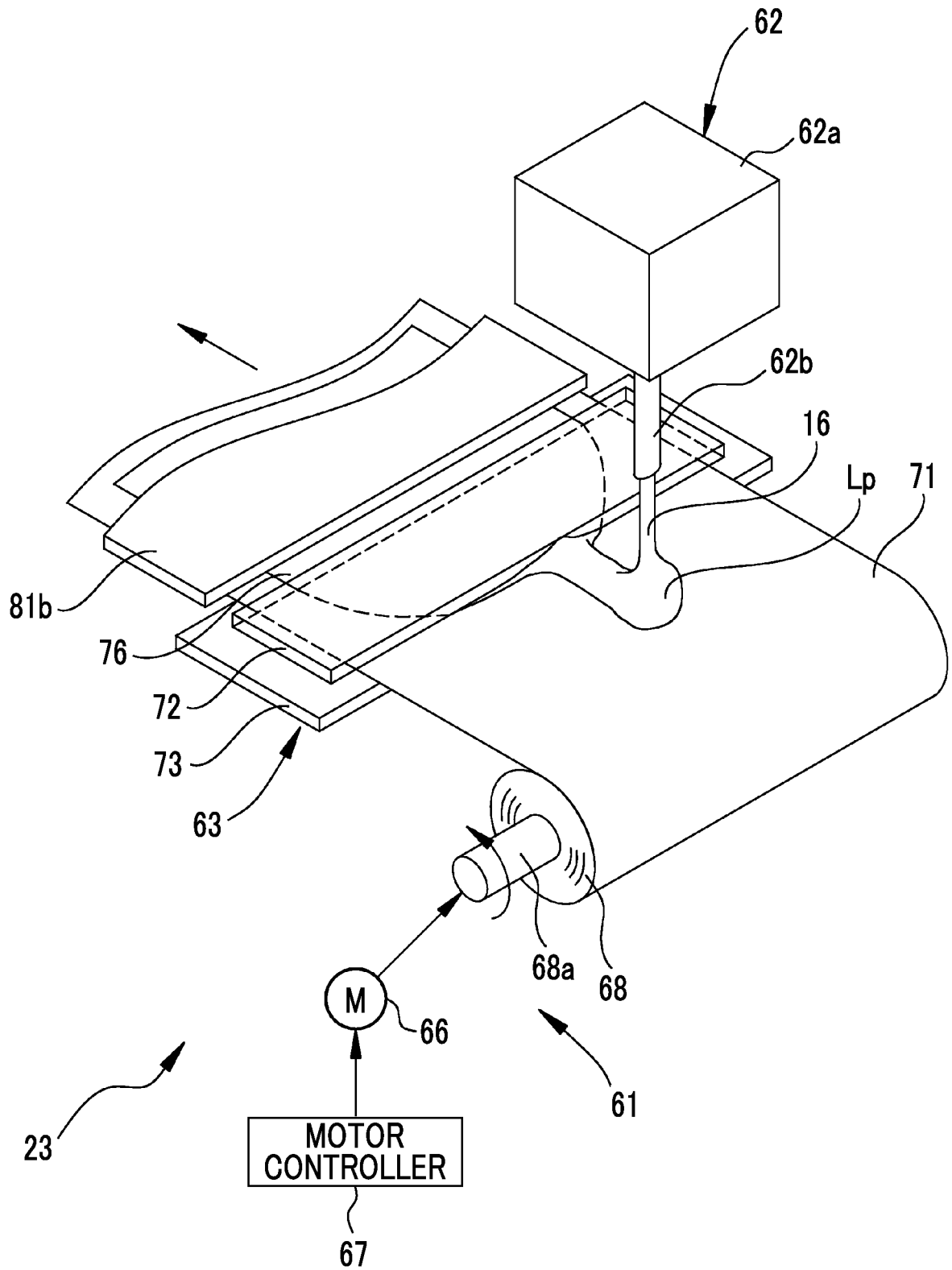
FIG. 8 is a schematic view of a film forming unit.

The obtained molding material 16 is supplied to, for example, the film forming unit 23 shown in FIG. 8. The film forming unit 23 is provided for molding the molding material 16 into a film. The film forming unit 23 includes a support supply section 61, a material supply section 62, and a film forming section 63. The support supply section 61 includes a motor 66 and a motor controller 67. The motor 66 is connected to a winding shaft 68a of a support roll 68 wound in a coil shape, and is driven and controlled by a motor controller 67 to rotate the winding shaft 68a. Thus, a long support 71 is continuously sent out from the support roll 68, and the support 71 moving in the longitudinal direction is directed to the film forming section 63.

The material supply section 62 is disposed above the support 71 toward the film forming section 63, and includes a storage section 62a and an outflow section 62b. The storage section 62a stores the molding material 16. The outflow section 62b is formed as a tubular member protruding from the bottom portion of the outflow section 62b, and flows out the molding material 16 from an opening (not shown) at the lower end. In the molding material 16, the specific gravity of the dispersed phase 31 is greater than the specific gravity of the continuous phase 32, so that the dispersed phase 31 is discharged from the outlet section 62b in a dense state and supplied to the support 71.

As will be described later, since the molding material 16 is spread and molded into a film shape in the film forming section 63, it is preferable to form a liquid pool LP of the molding material 16 on the support 71 by adjusting the moving speed of the support 71 and the flow rate of the molding material 16 from the material supply section 62. The number of the liquid pools LP may be two or more, but it is preferable that the number of the liquid pools is one from the viewpoint of further suppressing the disorder of the structure such as the arrangement of the dispersed phases 31. Since the support 71 is moving toward the film forming section 63, the molding material 16 of the liquid pool LP is transported to the film forming section 63 while gradually reducing the thickness. In the embodiment, the distance between the material supply section 62 and the film forming section 63 in the moving direction of the support 71 is set within a range of 1 cm or more and 15 cm or less, and thus, the liquid pool LP and the film forming section 63 have a constant distance. As a result, even in the molding material 16 toward the film forming section 63, the dispersed phase 31 sinks down more reliably.

In this example, in order to produce the porous film 10 in a long length, the molding material 16 is continuously discharged from the outflow section 62b, and thus, the molding material 16 is connected from the liquid pool LP to the film forming section 63. However, the porous film 10 may be produced in a sheet shape. In this case, for example, a first liquid pool LP1, a second liquid pool LP2, (not shown) are successively formed on the support 71 by discharging the molding material 16 intermittently from the outflow section 62b. In this example, the support 71 is continuously moved, but, for example, in a case where the porous film 10 is produced in a sheet shape, so-called intermittent feeding in which the support 71 is alternately moved and stopped may be adopted. In addition, in this example, the support 71 is moved, but the support 71 or the outflow section 62b may be relatively moved by moving at least one of the support 71 or the outflow section 62b.

The film forming section 63 includes a spreading plate 72 that is a plate-like spreading member, and a holding plate 73 that is a plate-like holding member. The spreading plate 72 and the holding plate 73 are disposed in a state in which the plates face each other via the moving path of the support 71. The spreading plate 72 is provided for spreading the transported molding material 16. The spreading plate 72 is disposed on the upper side of the support 71 in a posture parallel to the support 71. A distance G77 (refer to FIG. 9) between the spreading plate 72 and the support 71 is set according to the target thickness T10 (refer to FIG. 2). For example, this distance G77 may be set to be larger than the thickness T10 or may be set to be the same as the thickness T10. In the example, the distance G77 is set to be the same as the thickness T10. While passing through the spreading plate 72, the molding material 16 is spread on the support 71. By this spreading, the molding material 16 is spread in the width direction orthogonal to the longitudinal direction of the support 71, and is formed into a film (hereinafter, referred to as a liquid film) 76 (film forming step).

The holding plate 73 is provided for more reliably holding the posture of the support 71 while passing through the spreading plate 72. For example, in the example, the support 71 is used to hold the support 71 in parallel with the spreading plate 72. Therefore, the spreading plate is disposed below the support 71 in a posture parallel to the support 71. As a result, the guided support 71 is held in a parallel state, and passes through the spreading plate 72 while maintaining a distance from the spreading plate 72. As a result, the liquid film 76 is more reliably and continuously formed with a constant thickness. In a case where the support 71 passes through the spreading plate in a state in which the posture of the support 71 is held without holding the holding plate 73, the holding plate 73 may not be provided.

Figure 9:
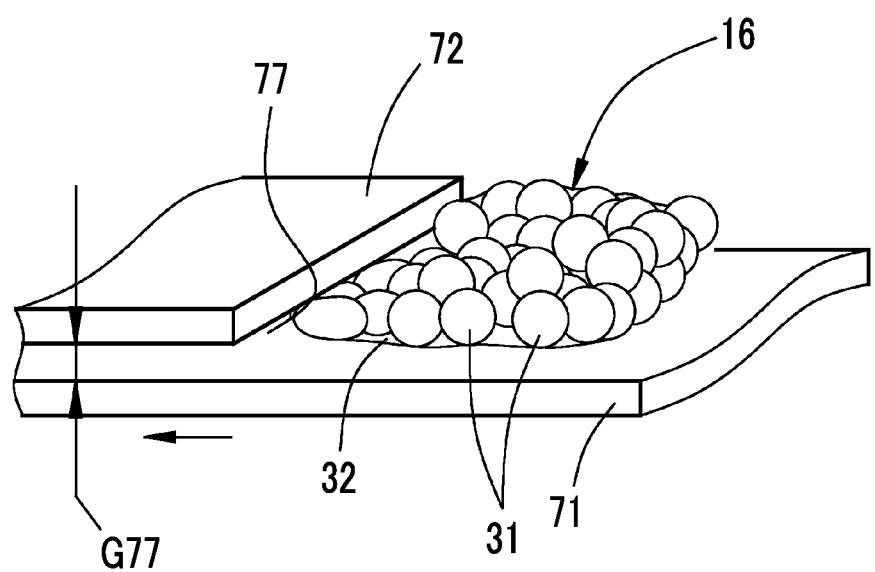
FIG. 9 is an explanatory view of the film forming step.

As shown in FIG. 9, the molding material 16 on the support 71 enters the gap 77 between the spreading plate 72 and the support 71. Since the molding material 16 is transported by the support 71, the molding material 16 is promoted to enter the gap 77 in combination with the capillary force of the gap 77. As a result, the porous film 10 is efficiently produced. In addition, since the dispersed phases 31 have a uniform size, the volume ratio of the dispersed phase 31 is high as described above, the dispersed phase 31 is sunk in the lower part of the molding material 16, and the molding material 16 is pressed from above by the spreading plate 72, the dispersed phases 31 are densely aligned in the width direction. As a result, in the gap 77, the liquid droplets as the dispersed phases 31 are arranged in a state of being in contact with each other, and the liquid film 76 in which the dispersed phases 31 are regularly arranged is formed. In the liquid film 76 in which the dispersed phases 31 are arranged in a state of being in contact with each other, the dispersed phase 31 is easily removed in the dispersed phase removal step described later, and thus the porous film 10 in which the void portions 12 communicate with each other is obtained.

In addition, as will be described later, the droplets of the dispersed phase 31 are freely deformable, and thus, the dispersed phases 31 included in the dense state are moved in the gap 77 toward the downstream side in the traveling direction while more reliably forming a regular arrangement. Therefore, the liquid film 76 is arranged in a state in which the dispersed phases 31 are distributed in an arrangement more reliably having regularity and the dispersed phases 31 are more reliably in contact with each other.

In addition, since the posture of the support 71 is held by the holding plate 73, the force (pressing force) pressed by the spreading plate 72 is kept constant. As a result, the liquid film 76 in which the arrangement state of the dispersed phases 31 is more uniform is continuously formed. Therefore, the arrangement of the void portions 12 is formed in a more uniform state in the porous film 10.

The spreading member is not limited to a plate-like member such as the spreading plate 72. For example, a spreading roller (not shown) which is a roller-like spreading member may be used. In the case where a spreading roller is used, the spreading roller may be disposed in a state in which the center axis of the circular cross section is arranged in a direction crossing the longitudinal direction of the support 71 (for example, the width direction of the support 71). Thus, the gap 77 is formed between the peripheral surface of the spreading roller and the support 71, and the molding material 16 enters the gap 77. In a case where the spreading roller is used, the holding plate 73 may be used in the same manner as in the example, or a holding roller (not shown) which is a roller-like holding member may be used instead of the holding plate 73. It is preferable that the holding roller is disposed in a state of facing the spreading roller via the moving path of the support 71. As described above, since the spreading member is provided for spreading the transported molding material 16 and has a spreading effect as long as the gap 77 is formed between the support 71 and the spreading member, the shape thereof is particularly limited. Further, since the holding member is provided for more reliably holding the posture of the support 71 while passing through the spreading plate 72, as long as the support 71 is supported in a state where the support 71 passes through the spreading plate while maintaining the distance from the spreading plate 72, the shape thereof is not particularly limited.

In this example, the liquid film 76 is formed on the support 71, but the liquid film 76 may be formed on the support 71. For example, the liquid film 76 is also formed on the support 71 by a method in which the flowing molding material 16 is molded into a film shape and then applied onto the support 71 in the molded state. In this case, for example, a known coating die or casting die may be replaced with the film forming section 63 and the material supply section 62.

The support 71 of the example is formed of polyethylene terephthalate. In this example, the obtained porous film 10 is peeled off from the support 71 as described later. Therefore, in the support 71, a material that is hard at a high temperature of, for example, 30° C., but becomes a sol by being cooled to a low temperature of, for example, 3° C. is formed in a layer on the upper surface in FIG. 9 (not shown, hereinafter, referred to as a peeling layer), and thus peeing is easily performed. Examples of the material include PLURONIC (registered trademark) F127 (manufactured by BASF SE) and the like, and PLURONIC F127 is used in the example as well.

Figure 10:
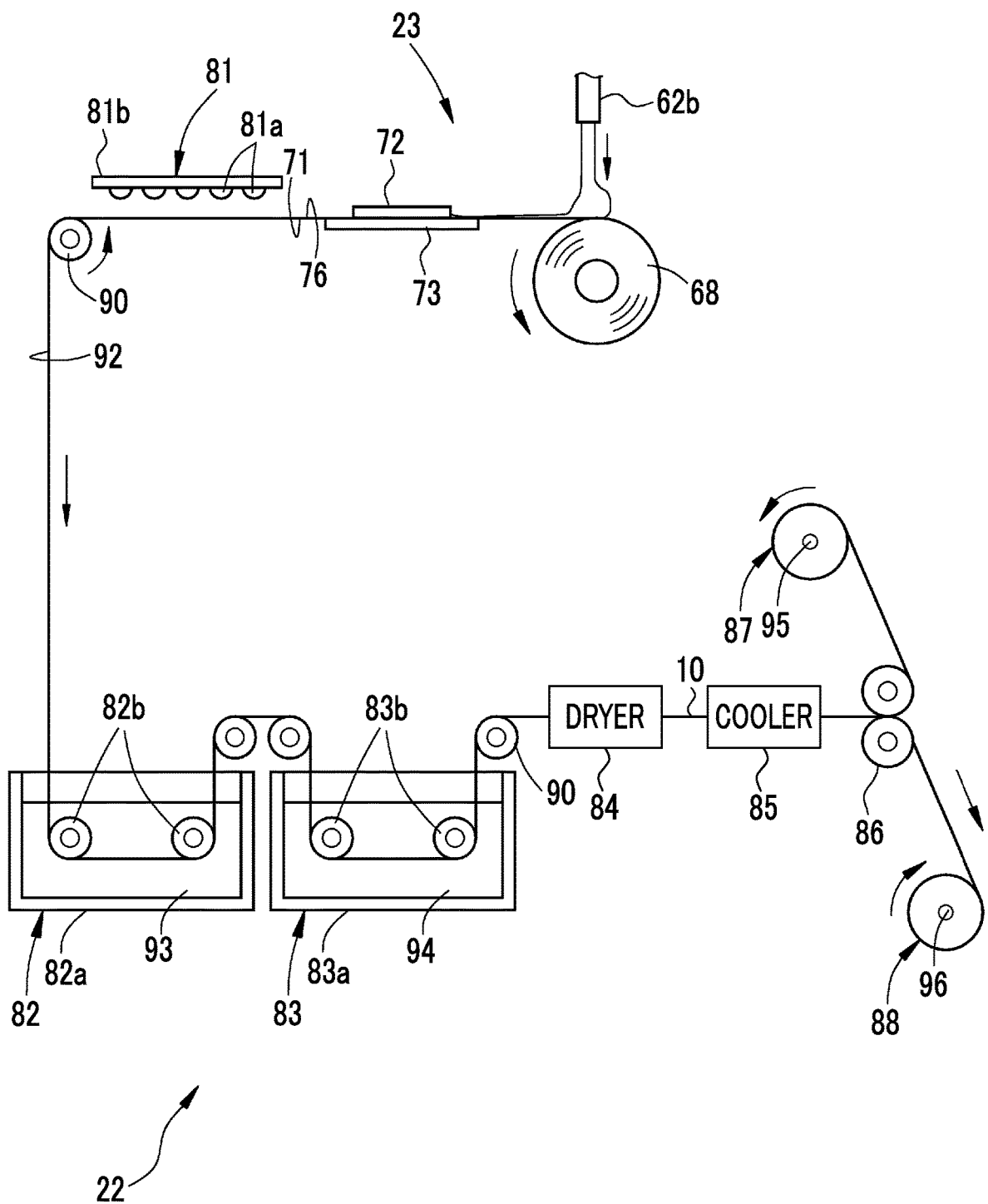
FIG. 10 is a schematic view of a molding device.

As shown in FIG. 10, in this example, the film forming unit 23 includes a light source unit 81 as a curing unit, a dispersed phase removing unit 82, a washing unit 83, a dryer 84, a cooler 85, a peeling unit 86, and a support winding unit 87, a film winding unit 88, and a molding device 22. The molding device 22 is provided with a plurality of rollers 90 for guiding the support 71, at least one of the plurality of rollers 90 is used as a driving roller that rotates in the circumferential direction, and the support 71 is transported by the rotation of the driving roller.

The light source unit 81 is provided for curing the curable compound contained in the continuous phase 32 of the liquid film 76 (refer to FIG. 9). In this example, since a photocurable compound is used as the curable compound, the light source unit 81 is used as the curing unit. The light source unit 81 includes a plurality of light sources 81a and a support member 81b that supports these light sources 81a. The light source 81a emits light that cures the photocurable compound. The light source unit 81 is disposed above the moving path of the support 71, and the light sources 81a are provided on the lower surface of the support member 81b. As a result, while passing below the light source unit 81, the liquid film 76 is irradiated with light to cure the curable compound by this irradiation (curing step), and the liquid film 76 becomes a solidified film 92 in which the continuous phase 32 is solidified. The light source 81a in this example emits ultraviolet rays as light.

The curing unit is not limited to the light source unit 81, and is determined according to the curing method of the curable compound. For example, in a case where the curable compound is a thermosetting compound that is cured by heating, various heating devices such as a heating oven (heating constant temperature bath) or an infrared heater may be used as the curing unit. In a case where the curable compound is an ion-curable compound that is cured by an ionic reaction, for example, a method of bringing an ion solution into contact with the liquid film 76 or the like is used. In the case where the second liquid 34 and the continuous phase 32 contain a solvent of the curable compound in addition to the curable compound, the solvent may remain when the curing step is completed. In such a case, even in a state in which the curable compound is in a cured state, the continuous phase 32 may not be completely solidified and may have flexibility.

The dispersed phase removing unit 82 is disposed on the downstream side of the light source unit 81 in the moving direction, and includes a liquid tank 82a and a roller 82b. The liquid tank 82a stores a dispersed phase removing liquid 93. The dispersed phase removing liquid 93 is a solvent for dissolving the dispersed phase 31 in the solidified film 92 and removing the dispersed phase 31 from the solidified film 92. Therefore, as the dispersed phase removing liquid 93, a liquid that exhibits solubility with respect to the dispersed phase 31 in the solidified film 92 and exhibits insolubility with respect to the continuous phase (a product produced by curing of the curable compound) in the solidified film 92 is used. The dispersed phase removing liquid 93 used in this example is acetone, but is not limited to acetone. In addition, regarding the liquid to be used, the insolubility with respect to the continuous phase in the solidified film is not limited to the meaning that the liquid does not dissolve at all, and as long as the solubility of the continuous phase after curing with respect to the liquid to be used is 0.01 g/ml or less, the liquid may be considered insoluble. However, in a case where the solvent of the curable compound remains in the continuous phase, even in a case where the solubility of the continuous phase is more than 0.01 g/ml, as long as the solubility of the product produced by curing the curable compound is 0.01 g/ml or less, the liquid may be considered insoluble.

The roller 82b is disposed below the liquid level of the dispersed phase removing liquid 93, and guides the support 71 on which the solidified film 92 is formed to the dispersed phase removing liquid 93. Thus, the solidified film 92 is immersed in the dispersed phase removing liquid 93, and the dispersed phase 31 is dissolved and removed while passing through the liquid (dispersed phase removal step).

Since the dispersed phases 31 are in contact with each other in the solidified film 92, the dispersed phases 31 are easily removed and thus the production efficiency of the porous film 10 is improved. In addition, since the dispersed phases 31 are in contact with each other in the solidified film 92, the dispersed phases 31 can be easily removed by a method other than immersion as long as the dispersed phase 31 is in contact with the dispersed phase removing liquid 93. For example, blowing, spraying, and the like may be used. Therefore, there is a degree of freedom in selecting a material to be used as the dispersed phase 31. As described above, since there is a degree of freedom in the material used as the dispersed phase 31, there is also a degree of freedom in selecting the material for the continuous phase 32 to be used together with the dispersed phase 31, and as a result, porous films 10 of various materials can be obtained.

The washing unit 83 is disposed on the downstream side of the dispersed phase removing unit 82 in the moving direction, and includes a liquid tank 83a and a roller 83b. The washing unit 83 of this example is used for reliably removing the slightly remaining dispersed phase 31. Therefore, in a case where the dispersed phase 31 is completely removed by the dispersed phase removing unit 82 and/or in a case where the dispersed phase 31 is completely removed by the dryer 84 described below even in a case where a small amount of the dispersed phase 31 remains, the washing unit 83 may not be provided.

The liquid tank 83a stores a washing liquid 94. The washing liquid 94 in this example is water. Thus, in addition to the removal of the dispersed phase 31 (washing step), for example, the porous film 10 used as a cell culture substrate is produced. The washing liquid 94 is not limited to water, and for example, ethanol or a mixture of water and ethanol can be used.

The dryer 84 is disposed on the downstream side of the washing unit 83 in the moving direction, and dries the solidified film 92 that has undergone the washing step to form the porous film 10. As described above, the continuous phase of this example contains water as a solvent in addition to the curable compound, and at least some of the water may be replaced with, for example, the dispersed phase removing liquid 93 and/or the washing liquid 94. However, according to the method, for example, the water initially contained in the continuous phase is removed by evaporation through the dispersed phase removing unit 82, the washing unit 83, and/or the dryer 84.

The cooler 85 is modified for gelating the above-mentioned peeling layer (not shown). The cooler 85 cools the porous film 10, the peeling layer, and the support 71 that overlap in the thickness direction. Thus, the peeling layer is gelated.

The peeling unit 86 includes a pair of rollers, the support 71 is wound around one of the pair of rollers, and the porous film 10 is wound around the other roller. A winding shaft 95 for winding the support 71 is set in the support winding unit 87, and a winding shaft 96 for winding the porous film 10 is set in the film winding unit 88. The support winding unit 87 and the film winding unit 88 are provided with a drive unit that drives the winding shaft 95 and the winding shaft 96 to be rotated. By respectively rotating the winding shaft 95 and the winding shaft 96 by the driving unit, the porous film 10 is peeled from the support 71 at the peeling unit 86, the support 71 is wound around the winding shaft 95 and the porous film 10 is wound around the winding shaft 96, respectively.

Although the above example is an example of producing the porous film 10 in which one layer of the void portions 12 is formed in the thickness direction, the produced porous film is not limited thereto. For example, a porous film in which two or more layers, that is, a plurality of layers of void portions 12 are formed in the thickness direction can also be produced. In a case where a plurality of layers of void portions 12 are formed in the thickness direction, the plurality of void portions 12 are formed in a close-packed arrangement state. The close-packed arrangement state includes both a state in which the void portions 12 are arranged in a hexagonal close-packed structure and a state in which the void portions 12 are arranged in a cubic close-packed structure (face-centered cubic lattice structure). In a case of producing such a porous film, a distance G77 between the spreading plate 72 and the support 71 (refer to FIG. 9) may be set to be larger than that in a case of producing a single layer porous film 10 and/or the diameter of the liquid droplets of the dispersed phases 31 may be set to be smaller than that in a case of producing the porous film 10.

EXPLANATION OF REFERENCES

10: porous film
10a: first film surface
10b: second film surface
12: void portion
12a: opening portion
13: partition wall
13a: communication hole
16: molding material
21: molding material preparation device
22: molding device
23: film forming unit
26, 46: base producing unit
27: adjustment unit
31: dispersed phase
32: continuous phase
33: first liquid
34: second liquid
37: emulsion base
37a: uneven distribution region
41: first pipe
41a: opening
42: second pipe
43: third pipe
43a: opening
51: container
52: pump
61: support supply section
62: material supply section
62a: storage section
62b: outflow section
63: film forming section
66: motor
67: motor controller
68: support roll
68a: winding shaft
71: support
72: spreading plate
73: holding plate
76: liquid film
77: gap
81: light source unit
82: dispersed phase removing unit
82a: liquid tank
82b: roller
83: washing unit
83a: liquid tank
83b: roller 84: dryer
85: cooler
86: peeling unit
87: support winding unit
88: film winding unit
90: roller
92: solidified film
93: dispersed phase removing liquid
94: washing liquid
G77: distance between spreading plate and support
LP: liquid pool

What is claimed is:

1. A method of producing a porous molded body from an emulsion including a continuous phase and a dispersed phase, the method comprising:
    a film forming step of forming a film on a support from the emulsion including a water phase containing a curable compound as the continuous phase;
    a curing step of curing the curable compound after the film forming step; and
    a dispersed phase removal step of removing the dispersed phase of the film after the curing step,
    wherein in the emulsion, in a case where a volume of the dispersed phase is X1 and a volume of the continuous phase is X2, a value of $X1/(X1+X2)$ is within a range of 0.5 or more and 0.9 or less, and a specific gravity of the dispersed phase is greater than a specific gravity of the continuous phase,
    the method further comprising:
    a base production step of discharging a first liquid forming the dispersed phase as a liquid droplet in a flow of a second liquid forming the continuous phase from a distal end of a tubular member in a direction of the flow of the second liquid to produce an emulsion base having a value of $X1/(X1+X2)$ smaller than that of the emulsion; and
    an uneven distribution step of unevenly distributing the dispersed phase in the emulsion base to generate an uneven distribution region having a value of $X1/(X1+X2)$ within a range of 0.5 or more and 0.9 or less in the emulsion base,
    wherein in the film forming step the uneven distribution region generated in the emulsion base is used as the emulsion.

2. The method of producing a porous molded body according to claim 1,
    wherein liquid droplets of the dispersed phase of the emulsion are freely deformable.

3. The method of producing a porous molded body according to claim 1,
    wherein in the emulsion, in a case where a specific gravity of the dispersed phase is Y1 and a specific gravity of the continuous phase is Y2, a specific gravity difference obtained by Y1−Y2 is at least 0.001.

4. The method of producing a porous molded body according to claim 2,
    wherein in the emulsion, in a case where a specific gravity of the dispersed phase is Y1 and a specific gravity of the continuous phase is Y2, a specific gravity difference obtained by Y1−Y2 is at least 0.001.

5. The method of producing a porous molded body according to claim 1,
    wherein in the film forming step, the emulsion is spread on the support to form the film.

6. The method of producing a porous molded body according to claim 2,
    wherein in the film forming step, the emulsion is spread on the support to form the film.

7. The method of producing a porous molded body according to claim 3,
    wherein in the film forming step, the emulsion is spread on the support to form the film.

8. The method of producing a porous molded body according to claim 4,
    wherein in the film forming step, the emulsion is spread on the support to form the film.

9. The method of producing a porous molded body according to claim 1,
    wherein in the film forming step, the film is formed on the moving support.

10. The method of producing a porous molded body according to claim 2,
    wherein in the film forming step, the film is formed on the moving support.

11. The method of producing a porous molded body according to claim 3,
    wherein in the film forming step, the film is formed on the moving support.

12. The method of producing a porous molded body according to claim 4,
    wherein in the film forming step, the film is formed on the moving support.

13. The method of producing a porous molded body according to claim 5,
    wherein in the film forming step, the film is formed on the moving support.

14. The method of producing a porous molded body according to claim 6,
    wherein in the film forming step, the film is formed on the moving support.

15. The method of producing a porous molded body according to claim 7,
    wherein in the film forming step, the film is formed on the moving support.

16. The method of producing a porous molded body according to claim 8,
    wherein in the film forming step, the film is formed on the moving support.

17. The method of producing a porous molded body according to claim 1,
    wherein in the dispersed phase removal step, a solvent of the dispersed phase is brought into contact with the film to remove the dispersed phase.

* * * * *